(12) United States Patent
Yoon et al.

(10) Patent No.: US 12,385,538 B2
(45) Date of Patent: Aug. 12, 2025

(54) BRAKE APPARATUS FOR VEHICLE

(71) Applicant: HYUNDAI MOBIS Co., Ltd., Seoul (KR)

(72) Inventors: Bo Ram Yoon, Yongin-si (KR); Yong Hee Kim, Yongin-si (KR); Ik Soon Choi, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 575 days.

(21) Appl. No.: 17/859,370

(22) Filed: Jul. 7, 2022

(65) Prior Publication Data

US 2023/0037330 A1 Feb. 9, 2023

(30) Foreign Application Priority Data

Aug. 5, 2021 (KR) .................. 10-2021-0103112
Aug. 5, 2021 (KR) .................. 10-2021-0103113

(51) Int. Cl.
*F16D 65/12* (2006.01)
*B60K 7/00* (2006.01)
(Continued)

(52) U.S. Cl.
CPC ............ *F16D 65/12* (2013.01); *B60K 7/0007* (2013.01); *F16D 55/22* (2013.01); *F16D 65/18* (2013.01);
(Continued)

(58) Field of Classification Search
CPC ......... F16D 65/12; F16D 65/18; F16D 55/22; F16D 2250/0084; B60K 7/0007; B60K 2007/0092
(Continued)

(56) References Cited

U.S. PATENT DOCUMENTS 3,675,743 A * 7/1972 Thompson ............ F16D 55/228
                                                      92/164
4,754,856 A * 7/1988 Villata .................. F16D 55/228
                                                      92/169.1
(Continued)

FOREIGN PATENT DOCUMENTS

CN    211892827 U       11/2020
CN    112576657 A  *    3/2021   ........... F16D 55/227
(Continued)

OTHER PUBLICATIONS

Office Action dated Mar. 13, 2025 issued in corresponding German Patent Application No. 10/118,479.2. (Note: WO 2013/141427 A1, U.S. Appl. No. 10/118,479 B2, and KR 10-2010-0098846 A previously submitted.).

(Continued)

*Primary Examiner* — Christopher P Schwartz
(74) *Attorney, Agent, or Firm* — Morgan, Lewis & Bockius LLP

(57) ABSTRACT

A brake apparatus for a vehicle may include: a stator unit fixed to an inside of a wheel of the vehicle, a rotor unit disposed to face the stator unit and rotated by electromagnetic interaction with the stator unit, a disc unit connected to the rotor unit and rotated together with the rotor unit, a pair of caliper units disposed on both sides of the disc unit and configured to generate a braking force by contacting with the disc unit as hydraulic pressure is applied, and a transfer unit connected to the pair of caliper units, and configured to transfer hydraulic pressure applied to one of the pair of caliper units to a remaining one of the pair of caliper units.

16 Claims, 16 Drawing Sheets

(51) Int. Cl.
  *F16D 55/22*   (2006.01)
  *F16D 65/18*   (2006.01)
(52) U.S. Cl.
  CPC ............... *B60K 2007/0092* (2013.01); *F16D 2250/0084* (2013.01)
(58) Field of Classification Search
  USPC ...... 188/72.1–72.5, 73.39, 73.41–73.47, 370
  See application file for complete search history.

(56) References Cited

U.S. PATENT DOCUMENTS

| | | | |
|---|---|---|---|
| 7,337,881 B1 * | 3/2008 | Sherman, II | F16D 55/22655 188/72.4 |
| 8,453,804 B2 * | 6/2013 | Pfister | F16D 55/02 188/73.31 |
| 8,925,690 B2 * | 1/2015 | Ogawa | F16D 65/095 188/73.31 |
| 10,118,479 B2 * | 11/2018 | Igi | F16D 55/2265 |
| 10,760,631 B1 | 9/2020 | Dennis | |

FOREIGN PATENT DOCUMENTS

| | | | | |
|---|---|---|---|---|
| DE | 3147200 A1 | 10/1982 | | |
| KR | 10-2010-0098846 A | 9/2010 | | |
| WO | 2013/112158 A1 | 8/2013 | | |
| WO | WO-2013141427 A1 * | 9/2013 | ........... | B60K 17/046 |

OTHER PUBLICATIONS

Office Action dated Mar. 22, 2025 issued in corresponding Chinese Patent Application No. 202210790205.9. (Note: WO 2013/141427 A1 and U.S. Pat. No. 4,754,856 A previously submitted.).

* cited by examiner

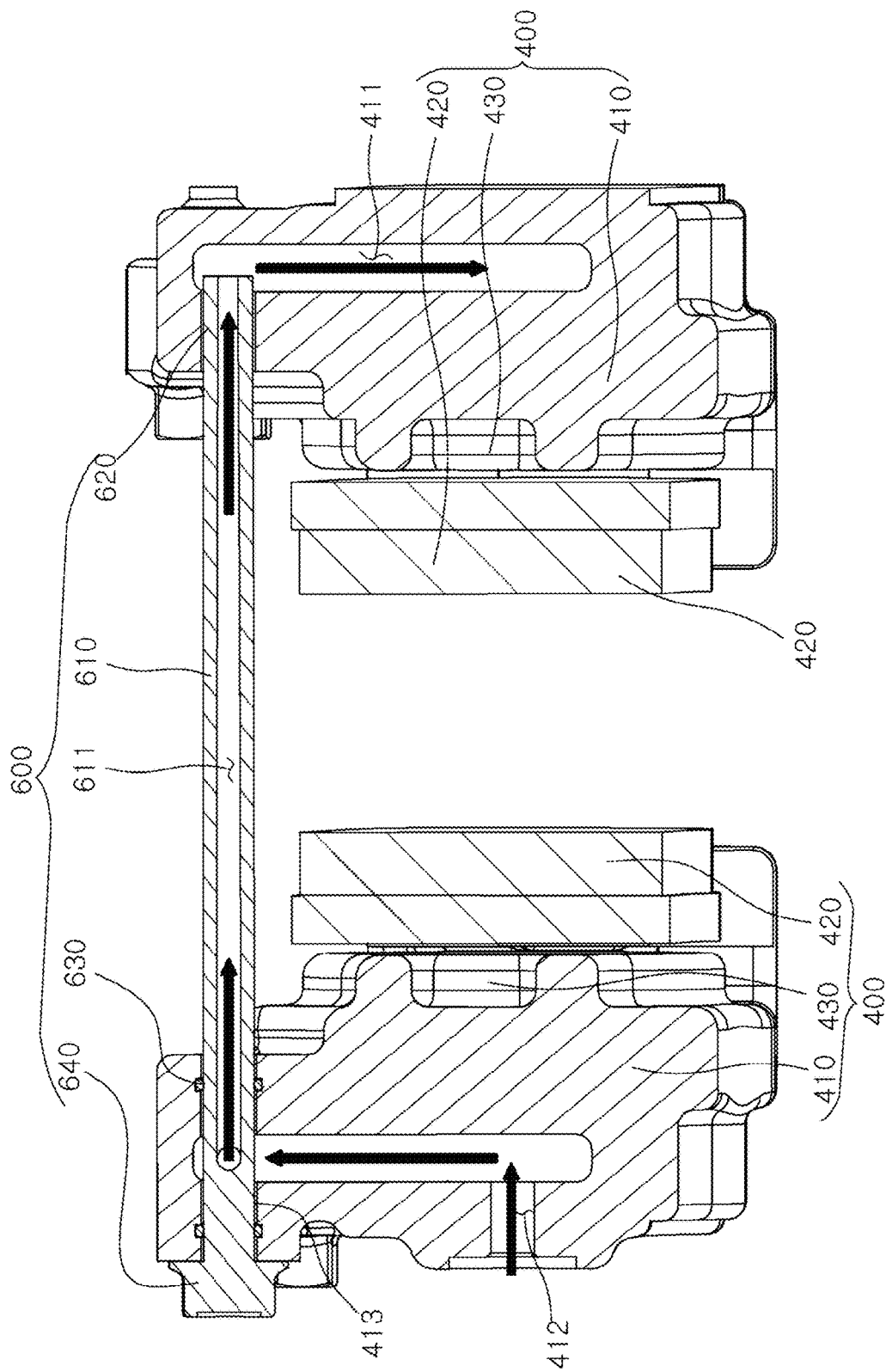

BRAKE APPARATUS FOR VEHICLE

CROSS-REFERENCE TO RELATED APPLICATION

This application claims priority from and the benefit of Korean Patent Application No. 10-2021-0103112, filed on Aug. 5, 2021 and Korean Patent Application No. 10-2021-0103113, filed on Aug. 5, 2021, which are hereby incorporated by reference for all purposes as if set forth herein.

BACKGROUND

Field

Exemplary embodiments of the present disclosure relate to a brake apparatus for a vehicle, and more particularly, to a brake apparatus for a vehicle, which is applied to an in-wheel motor.

Discussion of the Background

In general, a brake apparatus for a vehicle is an apparatus that pushes a piston through hydraulic pressure generated from a master cylinder or rotational force of a motor to allow a pad and a disc to come into close contact with each other, and brakes a vehicle by using a friction force between the pad and the disc. In the case of a fixed caliper configured as a single caliper body, multiple pistons may be configured on the inside and outside with a disc interposed therebetween, so that higher braking force may be secured compared to the layout. Such a fixed caliper is applied to mid-to-large-sized SUVs, high-performance sedans, and sports cars.

On the other hand, an e-corner module vehicle, which is the next-generation platform, is equipped with an in-wheel driving device that is mounted inside each wheel of the vehicle so that each wheel may be controlled independently, and since such an in-wheel itself is configured as a single driving motor, a space for mounting a brake apparatus is very limited. Therefore, when the existing fixed caliper brake is applied to an in-wheel, it may interference with adjacent components, and there is a problem in that it is difficult to secure braking safety equivalent to that of a general brake system.

The background art of the present disclosure is disclosed in Korean Patent Application Laid-Open No. 10-2010-0098846 (published on Sep. 10, 2010 and entitled "Disc Brake having Parking Function").

SUMMARY

Various embodiments are directed to providing a brake apparatus for a vehicle, capable of easily transferring a brake fluid to calipers separated from each other.

In order to solve the above problems, a brake apparatus for a vehicle in accordance with the present disclosure may include: a stator unit fixed to an inside of a wheel of the vehicle; a rotor unit disposed to face the stator unit and rotated by electromagnetic interaction with the stator unit; a disc unit connected to the rotor unit and rotated together with the rotor unit; a pair of caliper units disposed on both sides of the disc unit and configured to generate a braking force by contacting with the disc unit as hydraulic pressure is applied; and a transfer unit connected to the pair of caliper units, and configured to transfer hydraulic pressure applied to one of the pair of caliper units to a remaining one of the pair of caliper units.

Furthermore, each of the pair of caliper units may include: a caliper body part disposed to face one surface of the disc unit and including a cylinder configured to generate hydraulic pressure by a brake fluid flowing into the cylinder; a pad plate part disposed between the caliper body part and the disc unit; and a piston part slidably installed in the cylinder, and configured to move forward and backward by hydraulic pressure generated by the cylinder and to press the pad plate part toward the disc unit or release pressure on the pad plate part.

Furthermore, the transfer unit may include: a transfer member disposed between the pair of caliper body parts and having both sides connected with an inside of the pair of caliper body parts, respectively; a fixing part detachably coupled to the caliper body part and configured to prevent the transfer member from moving relative to the caliper body part; and a sealing part installed between the transfer member and the caliper body part, and configured to prevent the brake fluid from leaking to an outside of the caliper body part.

Furthermore, the transfer member may be inserted into an insertion portion penetrating through the caliper body part.

Furthermore, a flow part extending along a longitudinal direction of the transfer member may be defined in the transfer member.

Furthermore, the fixing part may protrude from an outer circumferential surface of the transfer member and may be screwed to an inner circumferential surface of the insertion portion.

Furthermore, the sealing part may be elastically deformable and may be in contact with an outer circumferential surface of the transfer member and an inner circumferential surface of the insertion portion.

Furthermore, the transfer unit may further include a stopper part extending from the transfer member and limiting a length of a portion of the transfer member that is inserted into the insertion portion.

Furthermore, the stopper part may be disposed at one end of the transfer member, and may be in contact with an outer surface of any one of the pair of caliper body parts as the transfer member is inserted into the insertion portion by a predetermined distance or more.

Furthermore, the stopper part may have a diameter larger than that of the transfer member.

Furthermore, a brake apparatus for a vehicle in accordance with the present disclosure may include: a stator unit fixed to an inside of a wheel of the vehicle; a rotor unit disposed to face the stator unit and rotated by electromagnetic interaction with the stator unit; a disc unit connected to the rotor unit and rotated together with the rotor unit; a pair of caliper units disposed on both sides of the disc unit and configured to generate a braking force by contacting with the disc unit as hydraulic pressure is applied; and a support unit extending from each of the pair of caliper units and supporting each of the pair of caliper units with respect to the stator unit.

Furthermore, the pair of caliper units may be separated from each other and are individually supported on the stator unit by the support unit.

Furthermore, each of the pair of caliper units may include: a caliper body part disposed to face one surface of the disc unit and including a cylinder that generates hydraulic pressure by a brake fluid flowing into the cylinder; a pad plate part disposed between the caliper body part and the disc unit; and a piston part slidably installed in the cylinder, and configured to move forward and backward by hydraulic pressure generated by the cylinder and to press the pad plate part toward the disc unit or release pressure on the pad plate part.

Furthermore, the support unit may include: a first support part extending from one of the pair of caliper units and detachably coupled to a first fastening part extending from the stator unit; and a second support part extending from a remaining one of the pair of caliper units and detachably coupled to a second fastening part extending from the stator unit.

Furthermore, the first support part and the second support part may be disposed on a same axis.

Furthermore, the first support part and the second support part may be disposed on different axes.

Furthermore, wherein the first support part and the second support part may be provided in plural and disposed to be spaced apart from each other on both sides of the caliper units, respectively.

A brake apparatus for a vehicle in accordance with the present disclosure can stably apply hydraulic pressure by using a transfer unit without separately installing hydraulic pressure generation means in a pair of caliper units separated from each other, and can synchronize an operation of the pair of caliper units.

Furthermore, a brake apparatus for a vehicle in accordance with the present disclosure can transfer a braking fluid only by a transfer member occupying a relatively small volume compared to an existing back, thereby preventing interference with adjacent components.

Furthermore, a brake apparatus for a vehicle in accordance with the present disclosure can prevent arbitrary movement of the transfer member in the longitudinal direction and a change in a communication state with a cylinder by using a fixing part, thereby securing stable operation performance of the caliper unit.

Furthermore, a brake apparatus for a vehicle in accordance with the present disclosure can prevent a brake fluid from leaking into a gap formed between the transfer member and an insertion portion by using a sealing part, and reduce concentricity tolerance between the transfer member and the insertion portion by an elastic restoring force of the sealing part.

Furthermore, a brake apparatus for a vehicle in accordance with the present disclosure can allow the transfer member and the cylinder to communicate at a fixed position by using a stopper part without visually checking, and prevent damage due to collision between components.

BRIEF DESCRIPTION OF THE DRAWINGS

FIG. 8 is an operation view schematically illustrating an operating state of the transfer unit in accordance with an embodiment of the present disclosure.

DETAILED DESCRIPTION OF THE ILLUSTRATED EMBODIMENTS

Figure 1:
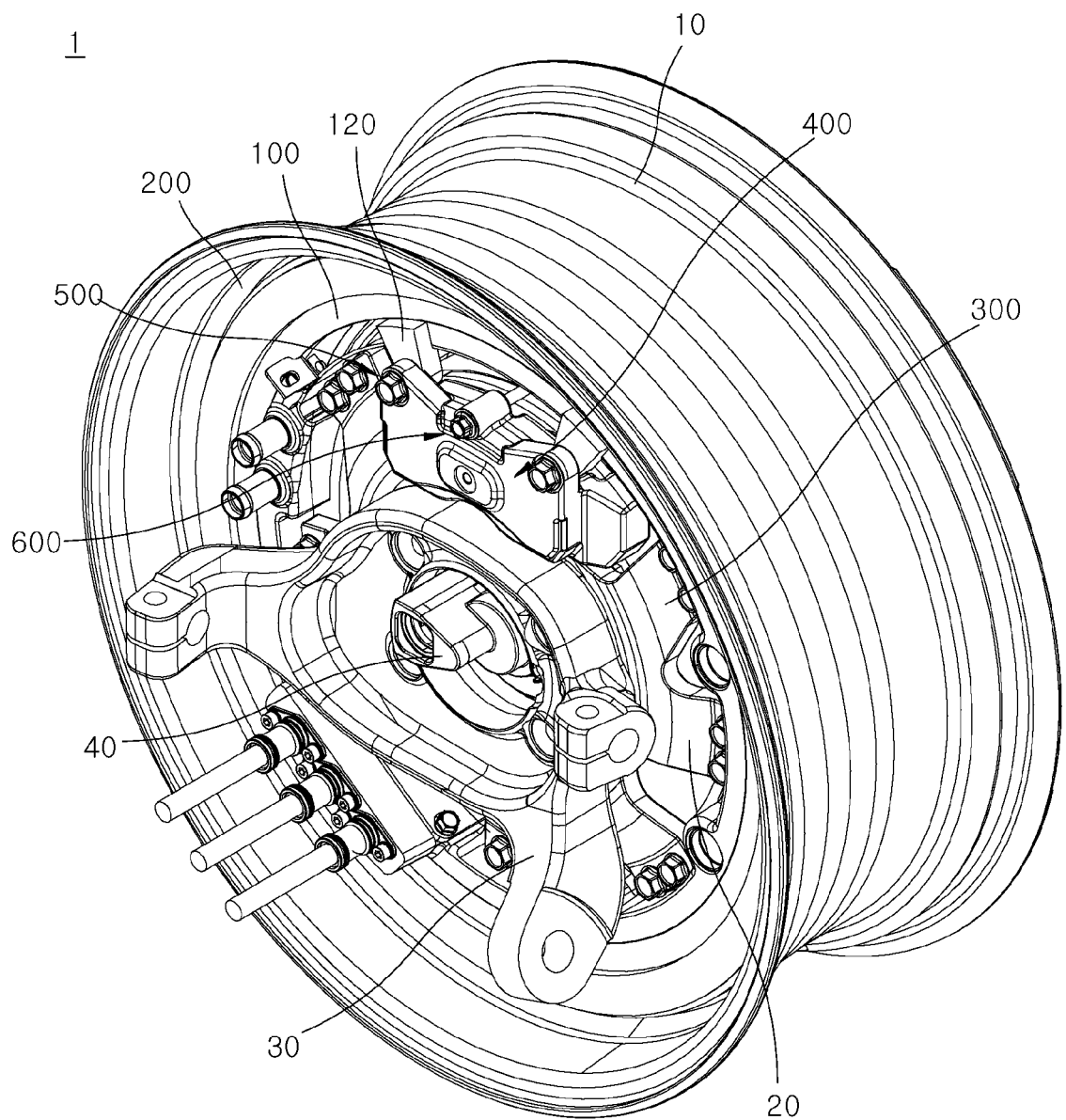
FIG. 1 is a perspective view schematically illustrating the configuration of a brake apparatus for a vehicle in accordance with an embodiment of the present disclosure.

Hereinafter, embodiments of a brake apparatus for a vehicle in accordance with the present disclosure will be described with reference to the accompanying drawings.

In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Furthermore, in the present specification, when a certain part is referred to as being 'connected (or coupled) to' another part, it may indicate that the former part is directly connected (or coupled) to the latter part or indirectly connected (or coupled) to the latter part with another part interposed therebetween. In the present specification, when a certain part "includes (or comprises)" a certain component, it means that the element does not exclude another component but may further "include (or comprise)" another component, unless referred to the contrary.

Furthermore, substantially the same reference numerals may refer to substantially the same components throughout the present specification. Even though substantially the same reference numerals or similar reference numerals are not mentioned or described in a specific drawing, the reference numerals may be described based on other drawings. Furthermore, even though there is a portion which is not indicated by reference numerals in a specific drawing, the portion may be described based on other drawings. Furthermore, the number, shapes, and sizes of detailed components included in the drawings of the present application and relative differences in the sizes are set for convenience of understanding, and do not limit embodiments and may be implemented in various forms.

Figure 2:
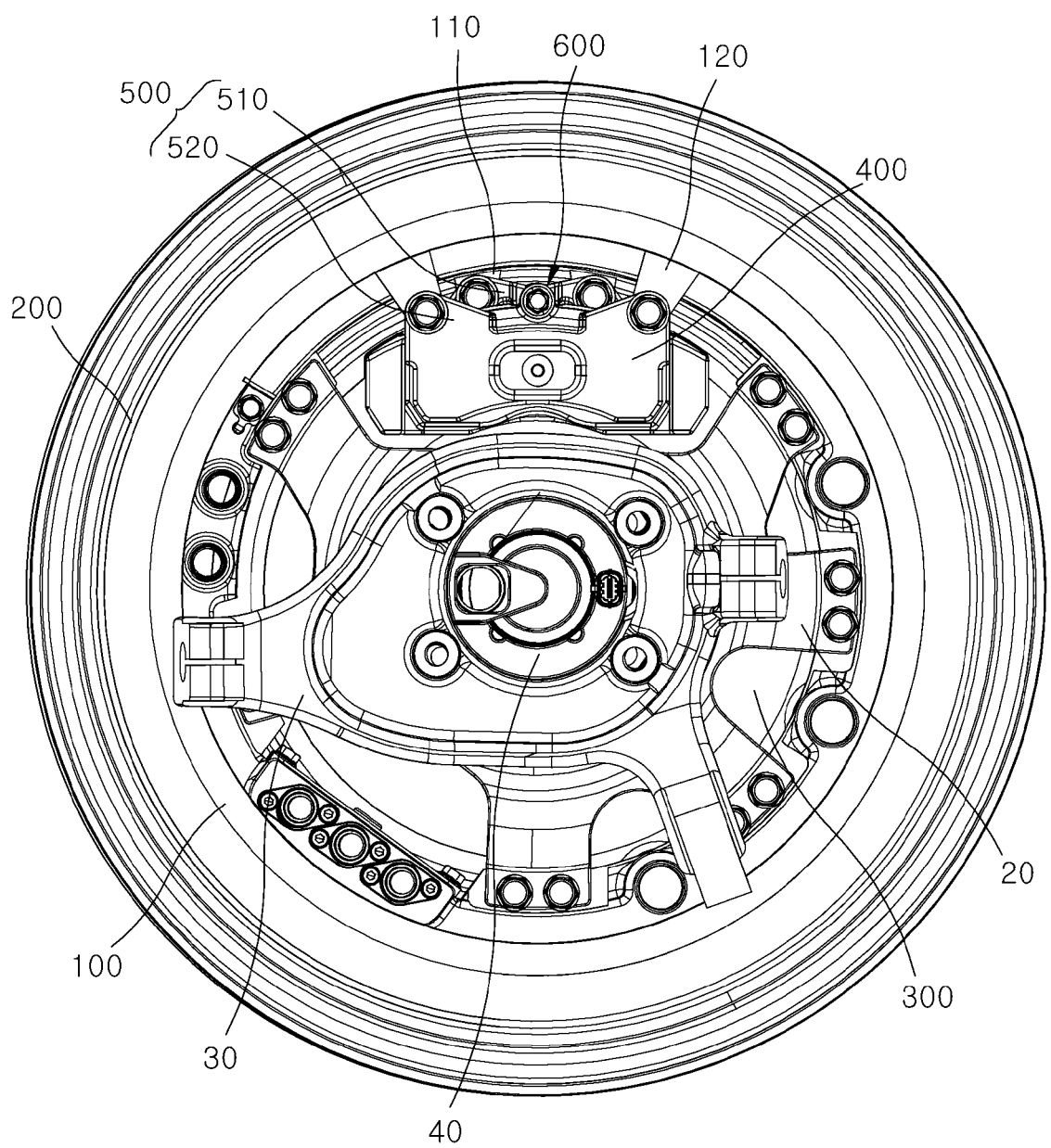
FIG. 2 is a front view schematically illustrating the configuration of the brake apparatus for a vehicle in accordance with an embodiment of the present disclosure.
Figure 3:
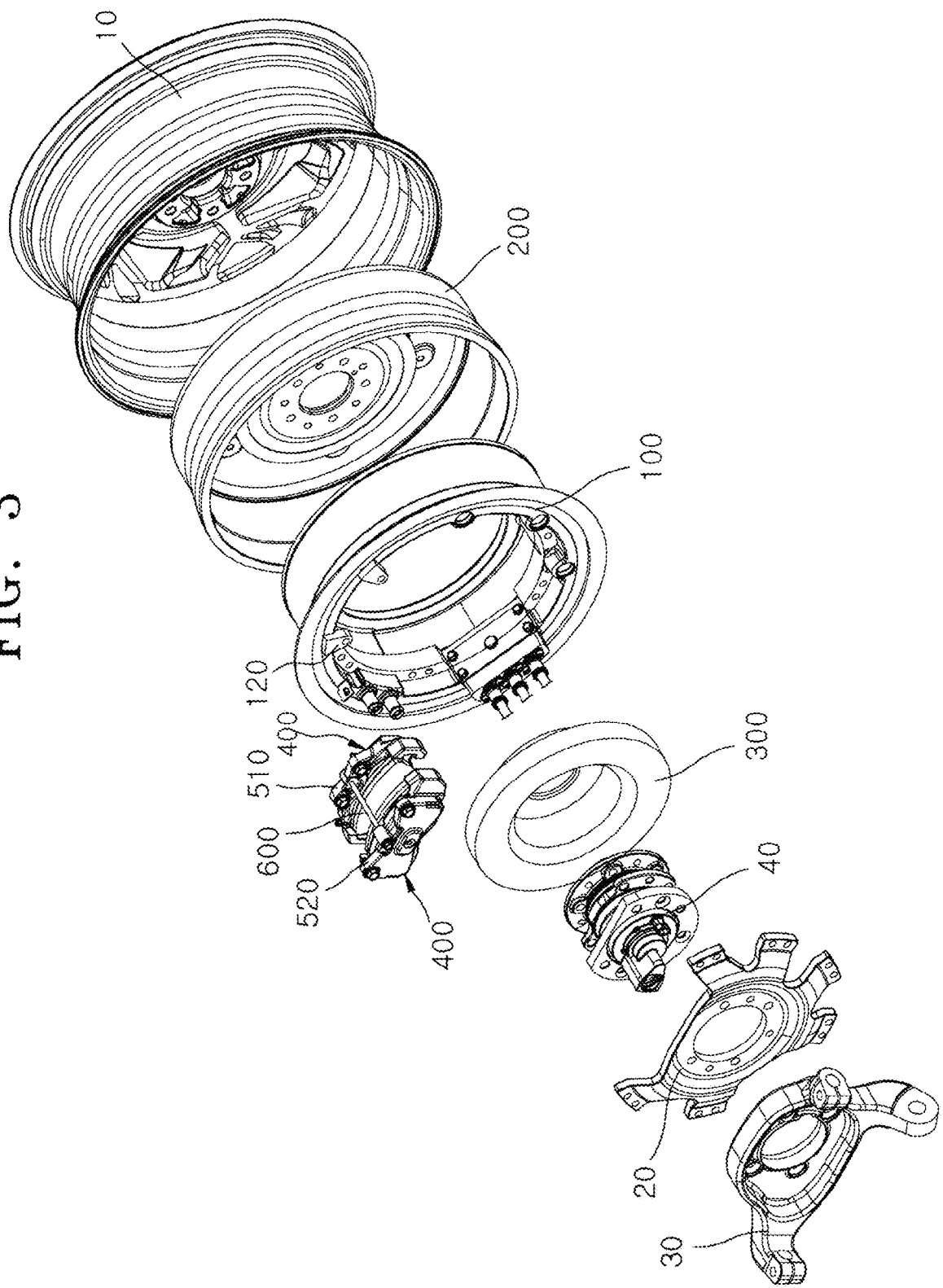
FIG. 3 is an exploded perspective view schematically illustrating the configuration of the brake apparatus for a vehicle in accordance with an embodiment of the present disclosure.

FIG. 1 is a perspective view schematically illustrating the configuration of a brake apparatus for a vehicle in accordance with an embodiment of the present disclosure, FIG. 2 is a front view schematically illustrating the configuration of the brake apparatus for a vehicle in accordance with an embodiment of the present disclosure, and FIG. 3 is an exploded perspective view schematically illustrating the configuration of the brake apparatus for a vehicle in accordance with an embodiment of the present disclosure.

Referring to FIG. 1 to FIG. 3, the brake apparatus for a vehicle in accordance with an embodiment of the present disclosure includes a stator unit 100, a rotor unit 200, a disc unit 300, a caliper unit 400, a support unit 500, and a transfer unit 600.

The stator unit 100 is fixed to the inside of a wheel 10 of a vehicle, and receives power from the outside to form a magnetic field that rotates a rotor unit 200 to be described below. The stator unit 100 in accordance with an embodiment of the present disclosure is formed to have a cylindrical shape with one side open and is disposed inside the wheel 10. The stator unit 100 is coupled to a knuckle 30 installed below the vehicle via an in-wheel bracket 20. Accordingly, the stator unit 100 may be fixed inside the wheel 10 in a non-rotation state. The stator unit 100 receives three-phase power from a battery of the vehicle through a terminal. The stator unit 100 includes a plurality of coils to form an electromagnetic force from the supplied power.

The stator unit 100 includes a first fastening part 110 and a second fastening part 120 coupled to a support unit 500 to be described below. The first fastening part 110 and the second fastening part 120 in accordance with an embodiment of the present disclosure extend from an inner circumferential surface of the stator unit 100 toward the radially inner side of the stator unit 100. The first fastening part 110 and the second fastening part 120 are respectively disposed to face a first support part 510 and a second support part 520 to be described below. Through holes, which extend in a direction parallel to an axial direction of the disc unit 300, may be formed at the ends of the first fastening part 110 and the second fastening part 120 so that the first fastening part 110 and the second fastening part 120 may be coupled to the first support part 510 and the second support part 520 by fastening means such as bolts and pins, respectively.

The first fastening part 110 and the second fastening part 120 are disposed to be spaced apart from each other by a predetermined distance along an axial direction of the stator unit 100. Hereinafter, a case where the first fastening part 110 is disposed on an outside (right side of FIG. 1) in a vehicle width direction and the second fastening part 120 is disposed on an inside (left side of FIG. 1) in the vehicle width direction will be described as an example. The distance at which the first fastening part 110 and the second fastening part 120 are spaced apart may be variously changed in design according to the thickness of the disc unit 300, the size of the caliper unit 400, and the like, which will be described below.

Each of the first fastening part 110 and the second fastening part 120 may be provided in plural. In such a case, the plurality of first fastening parts 110 and the plurality of second fastening parts 120 are disposed to be spaced apart from each other by a predetermined distance along a circumferential direction of the stator unit 100. FIG. 1 and FIG. 2 illustrate an example in which each of the first fastening part 110 and the second fastening part 120 is provided as a pair; however, the number of first fastening parts 110 and the number of second fastening parts 120 are not limited thereto and may be variously changed in design according to the number of first support parts 510 and the number of second support parts 520.

The rotor unit 200 is disposed inside the wheel 10 to face the stator unit 100. The rotor unit 200 is rotated about a central axis by electromagnetic interaction with the stator unit 100. The rotor unit 200 in accordance with an embodiment of the present disclosure is formed to have a cylindrical shape with one side open and is disposed between the wheel 10 and the stator unit 100. Accordingly, an inner circumferential surface and an outer circumferential surface of the rotor unit 200 are disposed to face an outer circumferential surface of the stator unit 100 and an inner circumferential surface of the wheel 10, respectively. The central axis of the rotor unit 200 is positioned on the same line as that of the wheel 10. The rotor unit 200 is rotatably supported inside the wheel 10 via a wheel bearing 40 connected to the knuckle 30. The rotor unit 200 includes a magnetic material such as a permanent magnet or a metal, and is rotated about the central axis by an electromagnetic force formed by the stator unit 100. The rotor unit 200 rotates the wheel 10 and the disc unit 300 when rotating about the central axis as both sides thereof are connected to the wheel 10 and the disc unit 300 by bolting or the like, respectively.

The disc unit 300 is connected to the rotor unit 200 and is provided to be rotatable together with the rotor unit 200. The disc unit 300 in accordance with an embodiment of the present invention is formed to have a disc shape and is installed inside the stator unit 100. The central axis of the disc unit 300 is positioned on the same line as that of the rotor unit 200. The disc unit 300 is disposed between the rotor unit 200 and the wheel bearing 40, and both sides thereof are connected to the rotor unit 200 and the wheel bearing 40 through bolting or the like, respectively. Accordingly, the disc unit 300 is rotated about the central axis together with the rotor unit 200 when the rotor unit 200 rotates. The diameter of the disc unit 300 may be variously changed in design according to the diameter of the wheel 10, the diameter of the stator unit 100, and the like.

The caliper unit 400 is disposed to face the disc unit 300, and generates a braking force by coming into contact with the disc unit 300 as hydraulic pressure generated by a pedal operation of a driver is applied. The caliper unit 400 may be provided as a pair. The pair of caliper units 400 are formed to be separated from each other and are symmetrically disposed on both sides of the disk unit 300. That is, the pair of caliper units 400 are formed to have a structure in which a back part or a bridge part is deleted from an existing brake caliper. Accordingly, the caliper units 400 may prevent interference with adjacent components in an in-wheel structure in which the layout of the inside of the wheel is relatively small compared to an internal combustion engine or an environmental vehicle, and may reduce overall weight. Furthermore, since the caliper units 400 may reduce the size of a core for forming an internal structure during casting as the structure of the back part is deleted, manufacturing cost may be reduced, and it is easy to secure heat capacity through diameter expansion of the disk unit 300. The pair of caliper units 400 are individually supported on the stator unit 100 by the support unit 500 to be described below. Accordingly, the pair of caliper units 400 may be individually designed in a shape suitable for layout conditions, and assembly properties may be improved.

Figure 4:
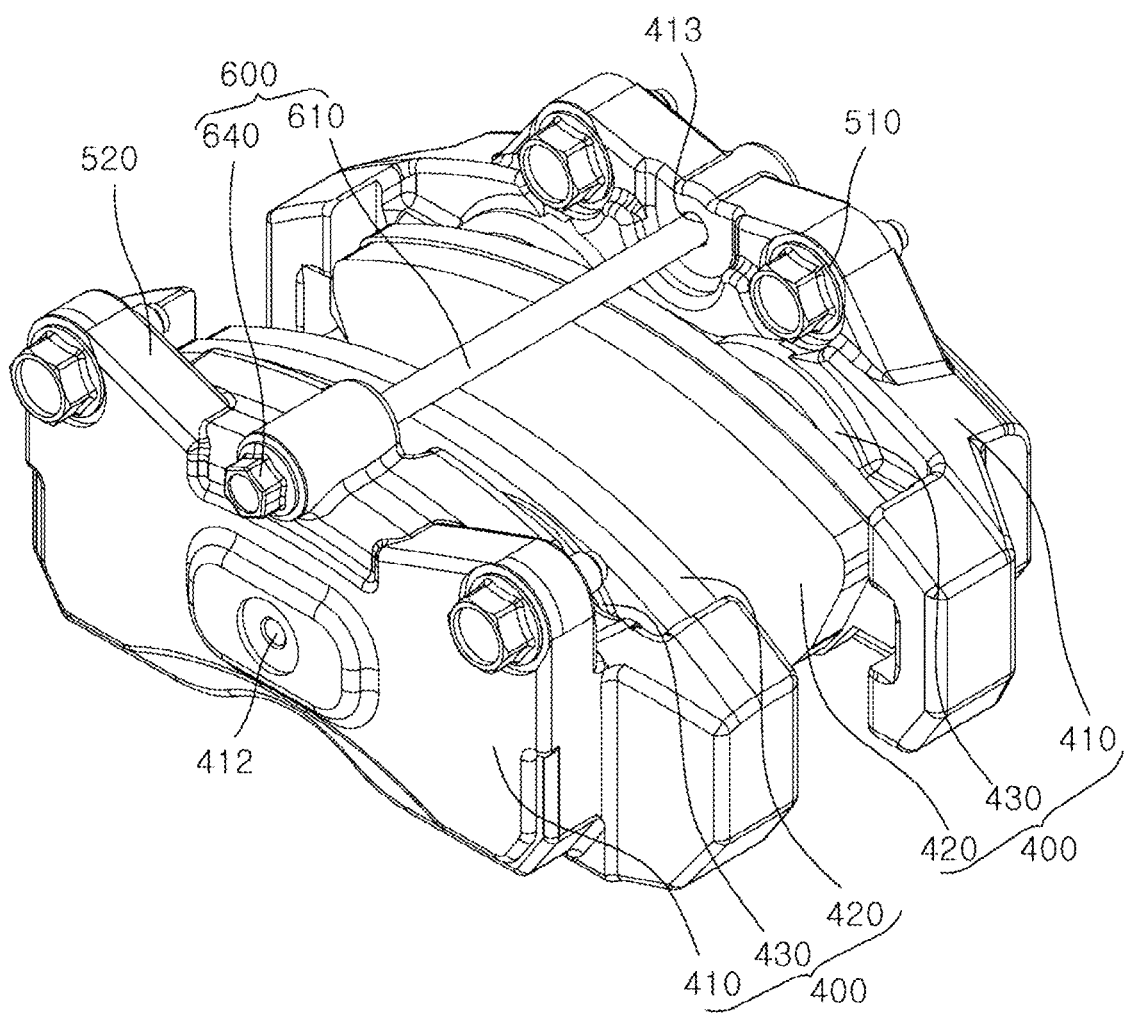
FIG. 4 is a perspective view schematically illustrating the configuration of a caliper unit, a support unit, and a transfer unit in accordance with an embodiment of the present disclosure.
Figure 5:
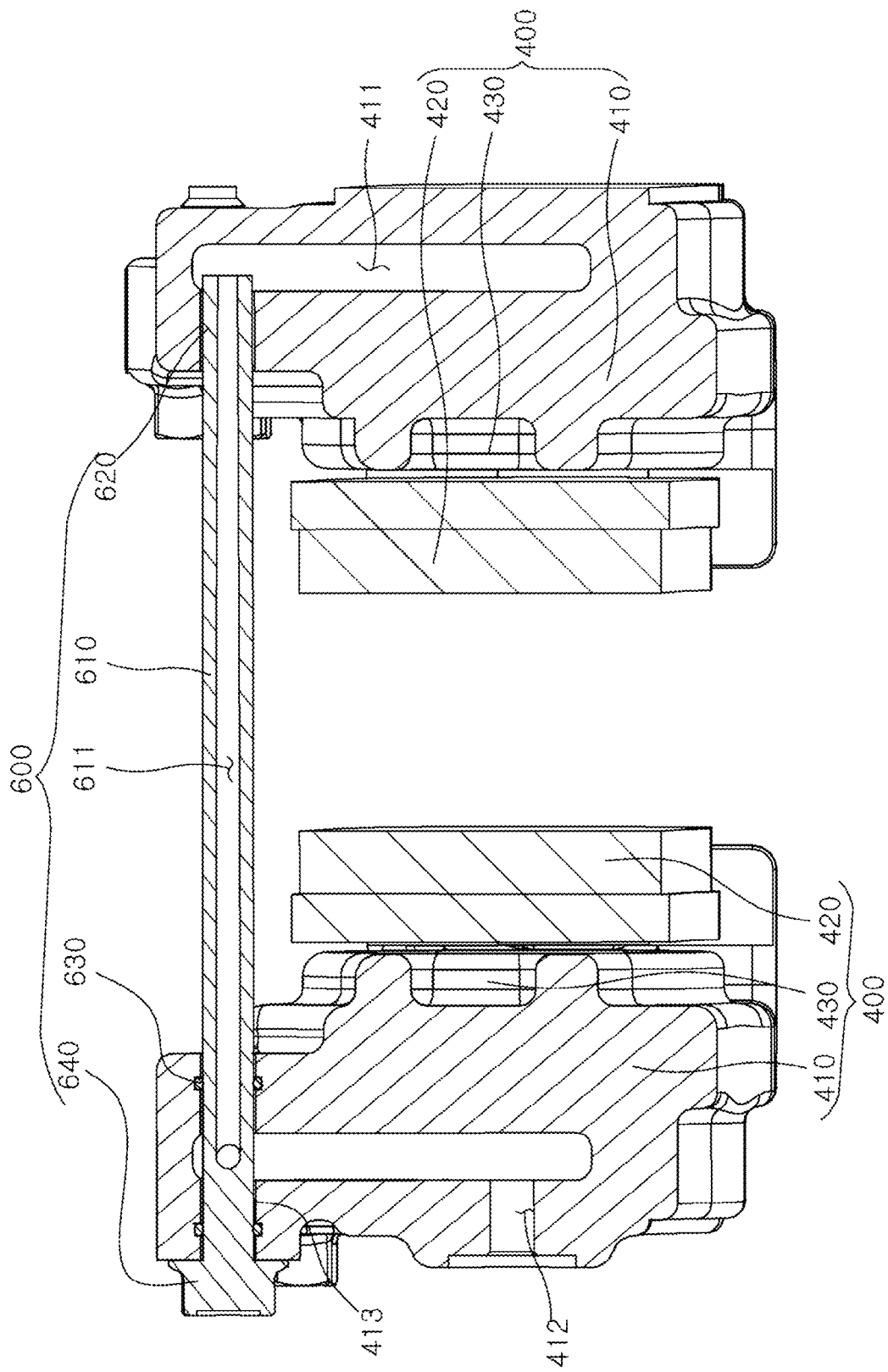
FIG. 5 is a cross-sectional view schematically illustrating the configuration of the caliper unit, the support unit, and the transfer unit in accordance with an embodiment of the present disclosure.

FIG. 4 is a perspective view schematically illustrating the configuration of the caliper unit 400, the support unit 500, and the transfer unit 600 in accordance with an embodiment of the present disclosure, and FIG. 5 is a cross-sectional view schematically illustrating the configuration of the caliper unit 400, the support unit 500, and the transfer unit 600 in accordance with an embodiment of the present disclosure.

Referring to FIG. 4 and FIG. 5, each caliper unit 400 in accordance with an embodiment of the present disclosure includes a caliper body part 410, a pad plate part 420, and a piston part 430.

The caliper body part 410 forms a schematic external appearance of the caliper unit 400 and supports the pad plate part 420 and the piston part 430 to be described below. The caliper body part 410 is disposed so that its inner surface is spaced apart from one surface of the disc unit 300 by a predetermined distance while facing the one surface. The caliper body parts 410 provided in the pair of caliper units 400 are spaced apart from each other in the vehicle width direction with the disk unit 300 interposed therebetween. The specific shape of the caliper body part 410 is not limited to the shape illustrated in FIG. 4, and various design changes are possible within the technical idea of a shape capable of supporting the pad plate part 420 and the piston part 430 to be described below.

The caliper body part 410 is provided therein with a cylinder 411. The cylinder 411 is concavely recessed inside the caliper body part 410 to form an empty space inside the caliper body part 410. The cylinder 411 is formed so that the side facing the disc unit 300 is opened. The cylinder 411 supports the piston part 430 to be described below to be slidably movable. A brake fluid such as oil flows into the cylinder 411 to form hydraulic pressure, and the cylinder 411 slidably moves the piston part 430 by the formed hydraulic pressure.

A port 412 is formed in the caliper body part 410 disposed on the inside (the left side of FIG. 4) in the vehicle width direction among the pair of caliper body parts 410. The port 412 in accordance with an embodiment of the present disclosure may be formed to have a shape of a hole formed through the caliper body part 410. Both sides of the port 412 are connected with the inside of the cylinder 411 and the outside of the caliper body part 410, respectively. The port 412 guides the flow of the brake fluid flowing into the cylinder 411 or discharged from the inside of the cylinder 411. Accordingly, the port 412 may transfer hydraulic pressure generated from a master cylinder of the vehicle by the pedal operation of the driver to the cylinder 411.

The caliper body part 410 is formed with an insertion portion 413 for supporting the transfer unit 600 to be described below. The insertion portion 413 in accordance with an embodiment of the present disclosure may be formed to have a shape of a hole penetrating an upper end of the caliper body part 410 in a direction parallel to the axial direction of the disc unit 300. The insertion portion 413 is formed to have a diameter corresponding to that of a transfer member 610 provided in the transfer unit 600. The insertion portion 413 is connected with the cylinder 411 so that the brake fluid inside the cylinder 411 may be transferred to the transfer member 610. The insertion portion 413 is provided as a pair and individually formed in the pair of caliper body parts 410. The pair of insertion portions 413 are disposed to face each other on the same axis.

The pad plate part 420 is disposed between the caliper body part 410 and the disc unit 300. The pad plate part 420 is slidably coupled to the caliper body part 410. The pad plate portion 420 slides in the direction parallel to the axial direction of the disc unit 300 by a pressing force applied from the piston part 430 to be described below, and an inner surface of the pad plate part 420 is in contact with or separated from the disc unit 300. A friction pad made of a material having a high friction coefficient, such as rubber, may be attached to the inner surface of the pad plate part 420 facing the disc unit 300. Accordingly, the pad plate part 420 may apply a braking force to the vehicle by a friction force generated when the pad plate part 420 comes into contact with the disc unit 300. The specific shape of the pad plate part 420 is not limited to the shape illustrated in FIG. 4, and various design changes are possible within the technical idea of a brake pad that comes into contact with the disc unit 300 and applies a braking force to the vehicle.

The piston part 430 is slidably installed in the cylinder 411. The piston part 430 moves forward and backward in the direction parallel to the axial direction of the disc unit 300 by the hydraulic pressure formed inside the cylinder 411. The piston part 430 presses the pad plate part 420 toward the disc unit 300 according to the movement direction or releases the pressure on the pad plate part 420. The piston unit 430 may be provided in plural and arranged in parallel along the width direction of the caliper body part 410. In such a case, the cylinder 411 may be formed in a number corresponding to the number of piston parts 430.

The support unit 500 extends from the caliper unit 400, is coupled to the first fastening part 110 and the second fastening part 120, and supports the caliper unit 400 with respect to the stator unit 100. Accordingly, the support unit 500 may stably fix the position of the caliper unit 400 without a structure of a torque member coupled to the existing knuckle 30, so that the size of the caliper unit 400 may be reduced to fit in-wheel layout conditions.

Figure 6:
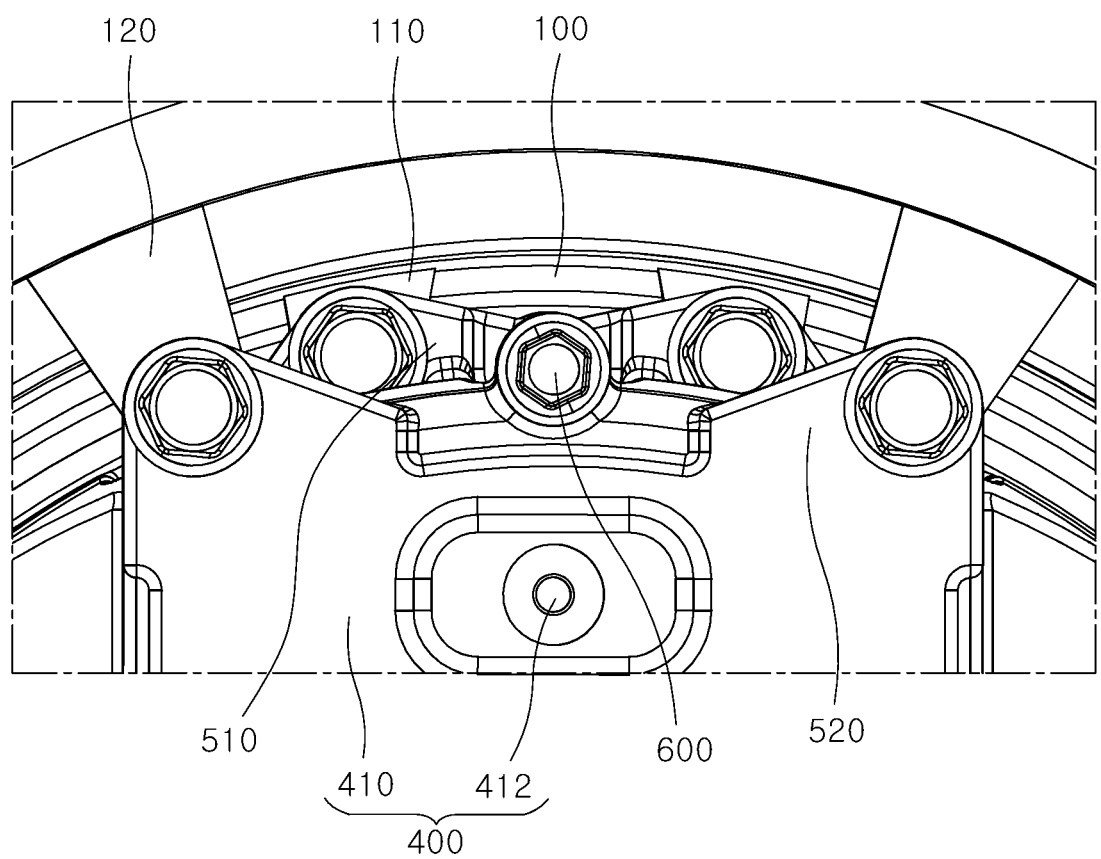
FIG. 6 is an enlarged view schematically illustrating the configuration of the support unit in accordance with an embodiment of the present disclosure.

FIG. 6 is an enlarged view schematically illustrating the configuration of the support unit 500 in accordance with an embodiment of the present disclosure.

Referring to FIG. 4 and FIG. 6, the support unit 500 in accordance with an embodiment of the present disclosure includes the first support part 510 and the second support part 520.

The first support part 510 and the second support part 520 extend from the pair of caliper units 400, respectively. Hereinafter, a case where the first support part 510 extends from the caliper unit 400 disposed on the outside (right side of FIG. 4) in the vehicle width direction among the pair of caliper units 400 and the second support part 520 extends from the caliper unit 400 disposed on the inside (the left side of FIG. 4) in the vehicle width direction among the pair of caliper units 400 will be described as an example.

The first support part 510 and the second support part 520 in accordance with an embodiment of the present disclosure may be formed to protrude upward from the upper end of the caliper body part 410. The first support part 510 and the second support part 520 have through holes extending in the direction parallel to the axial direction of the disk part 300, respectively. The first support part 510 and the second support part 520 are formed with through holes extending in the direction parallel to the axial direction of the disc unit 300, respectively. The first support part 510 and the second support part 520 are disposed to face the first fastening part 110 and the second fastening part 120 extending from the stator unit 100, respectively. The first support part 510 and the second support part 520 are detachably coupled to the first fastening part 110 and the second fastening part 120 by fastening means such as bolts and pins inserted through the through holes, respectively, and individually support the pair of caliper units 400.

The first support part 510 and the second support part 520 may be provided in plural and disposed on both sides of the pair of caliper units 400, respectively. For example, as illustrated in FIG. 4, the first support part 510 and the second support part 520 may be formed in a pair, and may be disposed to be spaced apart from each other by a predetermined distance on both sides of the caliper units 400 in the width direction. Accordingly, the first support part 510 and the second support part 520 may support the pair of caliper units 400 by a plurality of axes, respectively, thereby preventing the self-rotation of the caliper body part 410.

The first support part 510 and the second support part 520 may be disposed on different axes. That is, as illustrated in FIG. 4, the first support part 510 and the second support part 520 may be disposed such that the positions of the through holes are shifted from each other. Correspondingly to this, the first fastening part 110 and the second fastening part 120 are also disposed on different axes. Accordingly, an operator may fix the caliper part 400, which is disposed on the outside in the vehicle width direction and relatively first assembled among the pair of caliper units 400, to the stator unit 100 prior to the caliper part 400 disposed on the inside in the vehicle width direction, so that stable assembly is possible.

The transfer unit 600 is connected to the pair of caliper units 400, and transfers hydraulic pressure, which is applied to one of the pair of caliper units 400, to the other one of the pair of caliper units 400. That is, the transfer unit 600 is provided to provide a path through which the brake fluids may be mutually flown through the pair of caliper units 400. Accordingly, the transfer unit 600 may stably apply hydraulic pressure to the pair of caliper units 400 without separately installing hydraulic pressure generation means in the pair of caliper units 400 separated from each other, and synchronize the operation of the pair of caliper units 400.

Figure 7:
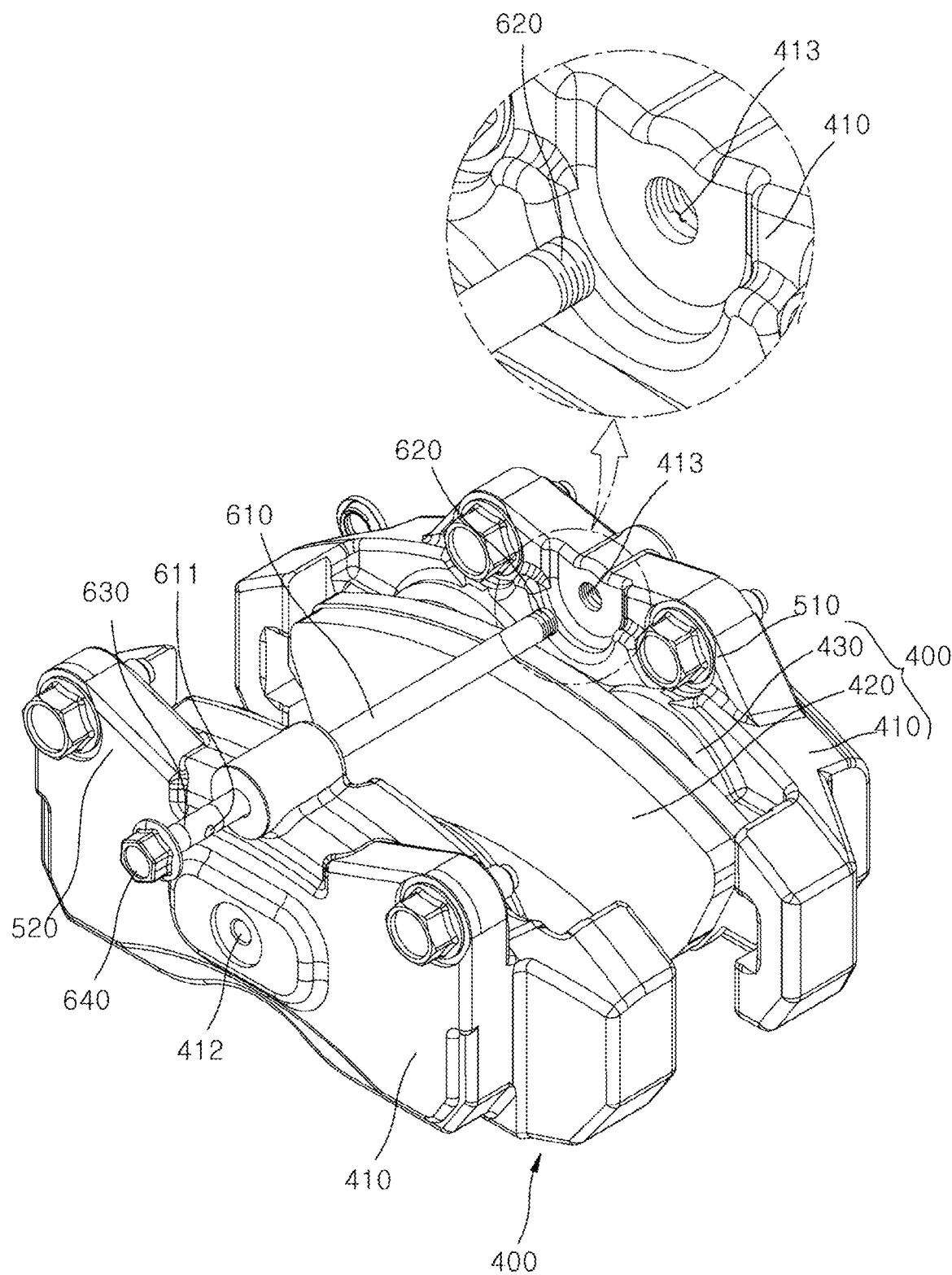
FIG. 7 is a perspective view schematically illustrating the configuration of the transfer unit in accordance with an embodiment of the present disclosure.
Figure 9A:
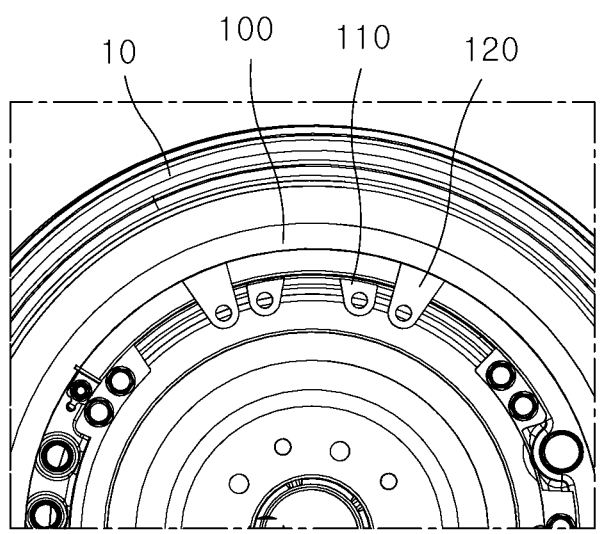
FIGS. 9A to 9F are a view schematically illustrating a process of assembling the brake apparatus for a vehicle in accordance with an embodiment of the present disclosure.
Figure 9B:
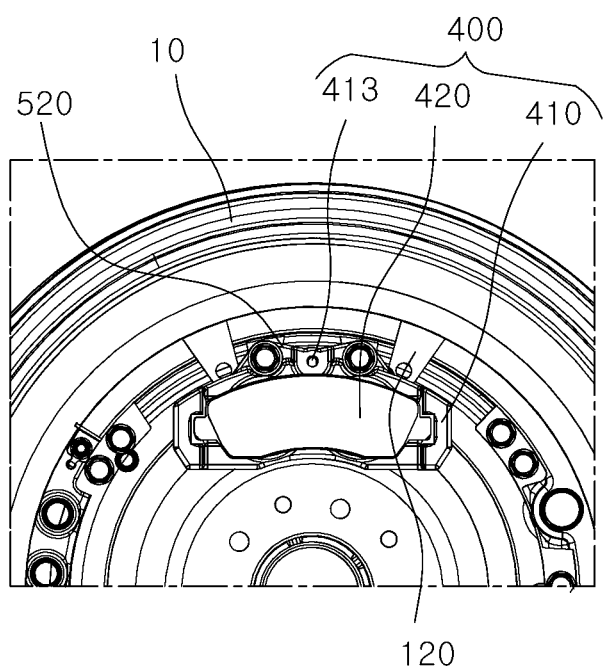
Figure 9C:
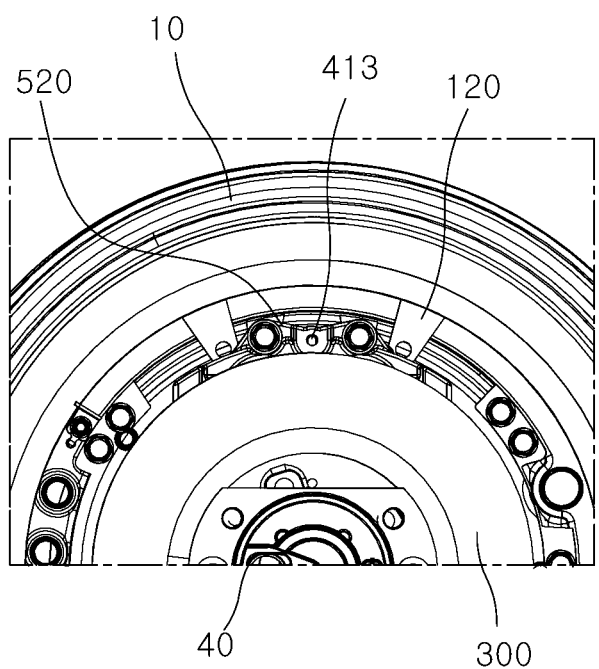
Figure 9D:
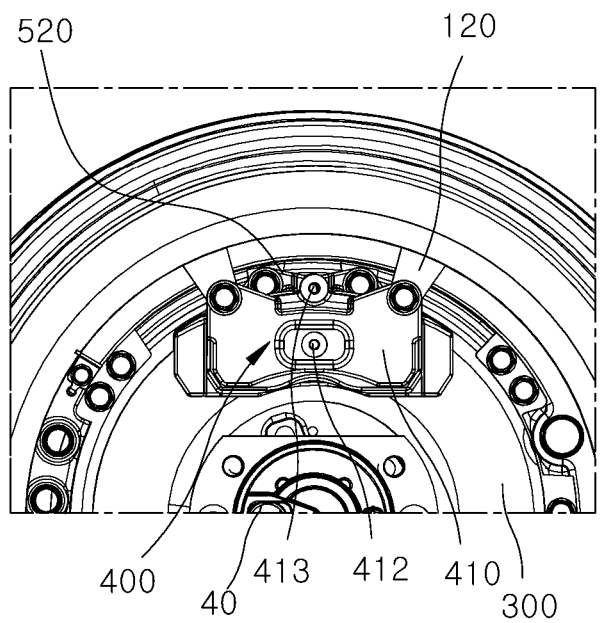
Figure 9E:
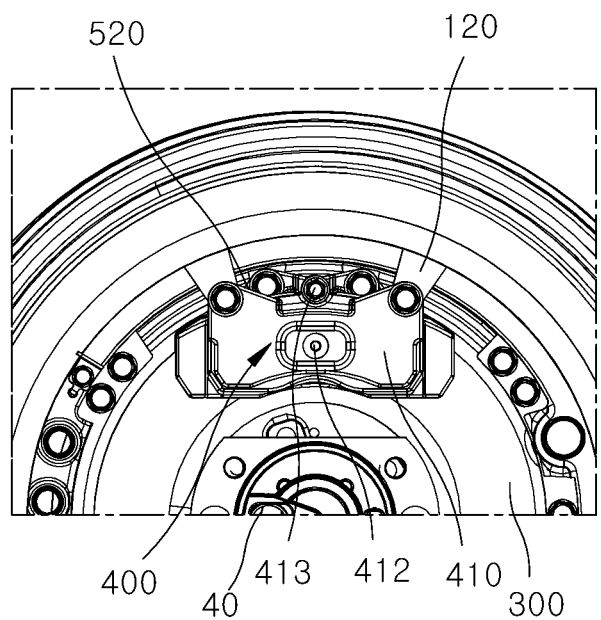
Figure 9F:
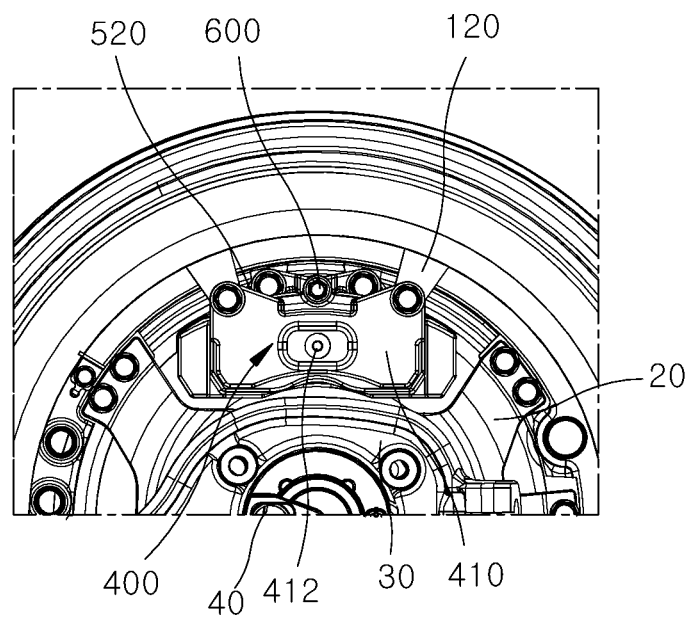

FIG. 7 is a perspective view schematically illustrating the configuration of the transfer unit 600 in accordance with an embodiment of the present disclosure, and FIG. 8 is an operation view schematically illustrating an operating state of the transfer unit 600 in accordance with an embodiment of the present disclosure.

Referring to FIG. 7 and FIG. 8, the transfer unit 600 in accordance with an embodiment of the present disclosure includes a transfer member 610, a fixing part 620, a sealing part 630, and a stopper part 640.

The transfer member 610 is disposed between the pair of caliper body parts 410 to guide the flow of the brake fluid. The transfer member 610 in accordance with an embodiment of the present disclosure may be formed to have a shape of a rod having a substantially circular cross-section. The transfer member 610 is inserted into the insertion portion 413 formed through the caliper body part 410. The transfer member 610 is supported in a state in which both ends thereof are inserted into the pair of insertion portions 413, respectively. As the transfer member 610 occupies a relatively small volume compared to the existing back, interference with adjacent components may be prevented.

The transfer member 610 is formed therein with a flow part 611 having a shape of a fluid path extending along the longitudinal direction of the transfer member 610. The flow part 611 is connected with the outside of the transfer member 610 through both ends thereof by passing through the transfer member 610 in an axial direction or a radial direction, respectively. When the transfer member 610 is completely inserted into the pair of insertion portions 413, both ends of the flow part 611 are connected with the inside of the pair of cylinders 411, respectively. The flow part 611 receives the brake fluid from one of the cylinders 411 through one end thereof and transfers the braking fluid to the other one of the cylinders 411 through the other end thereof.

The fixing part 620 is detachably coupled to the caliper body part 410 to prevent the transfer member 610 from moving relative to the caliper body part 410. Accordingly, the fixing part 620 may prevent the transfer member 610 from being arbitrarily moved in the longitudinal direction and the communication state with the cylinders 411 from being changed. The fixing part 620 in accordance with an embodiment of the present disclosure may be formed to have a thread shape protruding from the outer circumferential surface of one end (the right end of FIG. 7) of the transfer member 610. The fixing part 620 is screwed to the inner circumferential surface of the insertion portion 413 formed in the caliper body part 410 disposed on the outside (the right side of FIG. 7) in the vehicle width direction, and prevents relative movement of the transfer member 610 with respect to the caliper body part 410.

The sealing part 630 is installed between the transfer member 610 and the caliper body part 410, and prevents the brake fluid from leaking to the outside of the caliper body part 410. The sealing part 630 in accordance with an embodiment of the present disclosure is formed to have a circular ring shape and is installed between the outer circumferential surface of the transfer member 610 and the inner circumferential surface of the insertion portion 413. The sealing part 630 is provided to be elastically deformable so that the inner circumferential surface and the outer circumferential surface thereof are in close contact with the outer circumferential surface of the transfer member 610 and the inner circumferential surface of the insertion portion 413, respectively. Accordingly, the sealing part 630 may effectively prevent the brake fluid from leaking into a gap formed between the transfer member 610 and the insertion portion 413. Furthermore, the sealing part 630 may reduce concentricity tolerance between the transfer member 610 and the insertion portion 413 by its own elastic restoring force. A plurality of sealing units 630 may be provided to be spaced apart from each other by a predetermined distance along the longitudinal direction of the transfer member 610. FIG. 4 and FIG. 7 illustrate an example in which the sealing part 630 is installed on the side of the insertion portion 413 formed in the caliper body part 410 disposed on the inside (left side of FIG. 7) in the vehicle width direction; however, the location of the sealing part 630 is not limited thereto and the sealing part 630 may also be installed on the side of the insertion portion 413 formed in the caliper body part 410 disposed on the outside (right side of FIG. 7) in the vehicle width direction.

The stopper part 640 extends from the transfer member 610 and limits the length at which the transfer member 610 is inserted into the insertion portion 413. More specifically, the stopper part 640 is disposed at one end of the transfer member 610, and comes into contact with the outer surface of any one of the pair of caliper body parts 410 as the transfer member 610 is inserted into the insertion portion 413 by a predetermined distance or more. Accordingly, the stopper part 640 may allow the transfer member 610 and the cylinder 411 to communicate at a fixed position without visually checking during the assembly process of the transfer unit 600, and may prevent damage due to collision between components. The stopper part 640 in accordance with an embodiment of the present disclosure is formed in the form of a bolt head having a larger diameter than that of the transfer member 610 and is disposed on the other end (left end of FIG. 7) of the transfer member 610. As the transfer member 610 is inserted into the insertion portion 413 by a predetermined distance or more, the inner surface of the stopper part 640 comes into contact with the outer surface of the caliper body part 410 disposed on the inside (left side of FIG. 7) in the vehicle width direction, so that the transfer member 610 is fixed at a fixed position.

Hereinafter, a process of assembling the brake apparatus 1 for a vehicle in accordance with an embodiment of the present disclosure will be described in detail.

FIG. 9 is a view schematically illustrating a process of assembling the brake apparatus 1 for a vehicle in accordance with an embodiment of the present disclosure.

Referring to FIG. 9 (*a*), the stator unit 100 and the rotor unit 200 are installed inside the wheel 10 of the vehicle.

Referring to FIG. 9 (*b*), the caliper unit 400 disposed on the outside in the vehicle width direction is fixed to the stator unit 100 by coupling the first fastening part 110 and the first support part 510 through fastening means such as bolts.

Referring to FIG. 9 (*c*), the disc unit 300 and the wheel bearing 40 are assembled to the rotor unit 200 by bolting or the like. Accordingly, the disc unit 300 and the wheel bearing 40 may be integrally coupled with the rotor unit 200 and rotated about the central axis together with the rotor unit 200.

Referring to FIG. 9 (*d*), the caliper unit 400 disposed on the inside in the vehicle width direction is fixed to the stator unit 100 by coupling the second fastening part 120 and the second support part 520 through fastening means such as bolts.

Referring to FIG. 9 (*e*), the transfer unit 600 is connected to the pair of caliper units 400.

More specifically, first, one end of the transfer member 610 is sequentially inserted into the insertion portion 413 formed in the caliper unit 400 disposed on the inside in the vehicle width direction and the insertion portion 413 formed in the caliper unit 400 disposed on the outside in the vehicle width direction.

When the one end of the transfer member 610 is inserted into the insertion portion 413 formed in the caliper unit 400 disposed on the outside in the vehicle width direction, an operator rotates the transfer member 610 about the central axis to screw the fixing part 620 to the inner circumferential surface of the insertion portion 413.

As the transfer member 610 is inserted into the insertion portion 413 by a predetermined distance or more, the inner surface of the stopper part 640 comes into contact with the outer surface of the caliper body part 410 disposed on the inside in the vehicle width direction, so that the transfer member 610 is fixed at a fixed position.

Hereinafter, the configuration of a brake apparatus 1' for a vehicle in accordance with another embodiment of the present disclosure will be described in detail. In this process, for convenience of description, description overlapping with the brake apparatus 1 for a vehicle in accordance with an embodiment of the present disclosure will be omitted.

Figure 10:
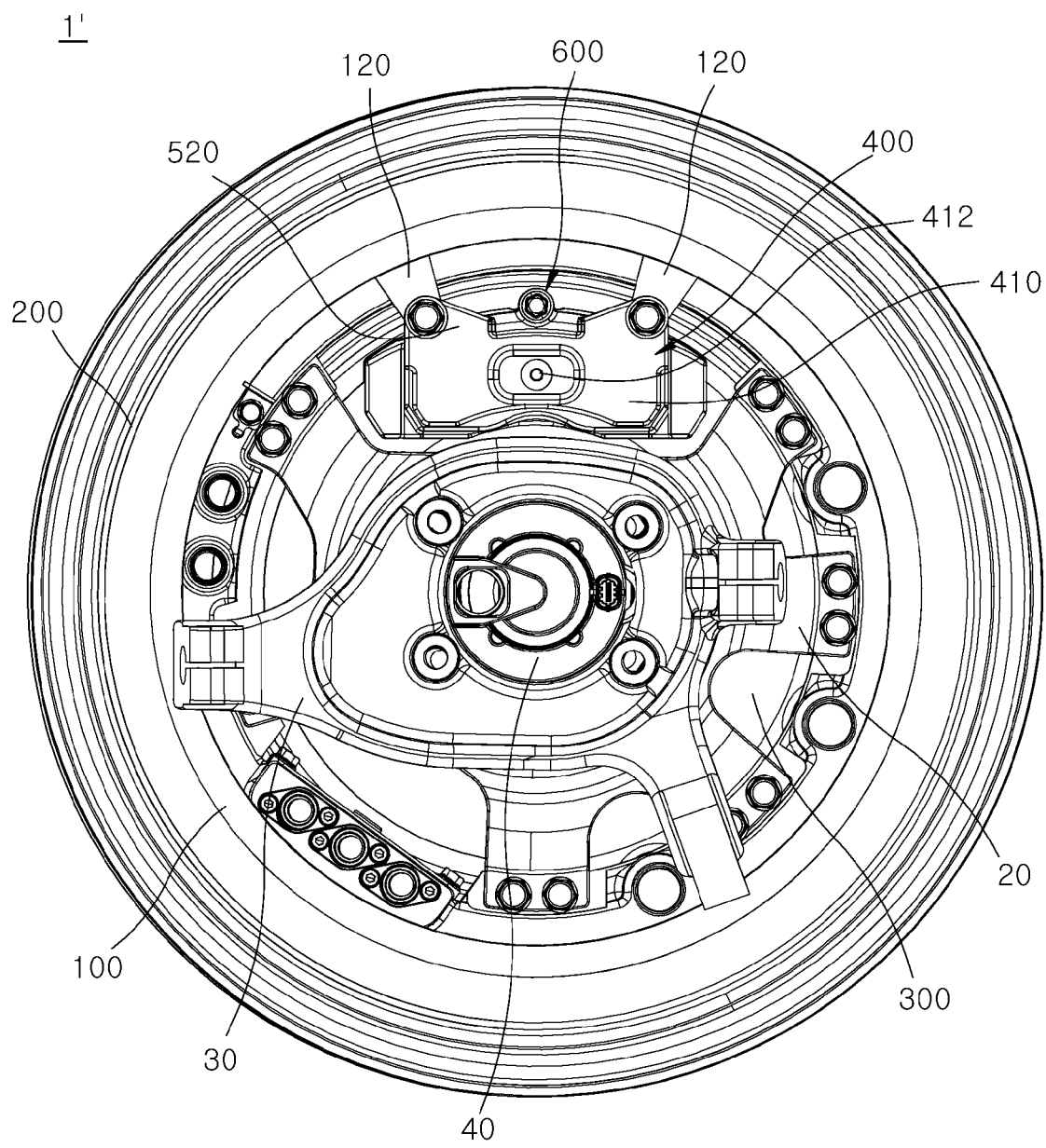
FIG. 10 is a front view schematically illustrating the configuration of a brake apparatus for a vehicle in accordance with another embodiment of the present disclosure.
Figure 11:
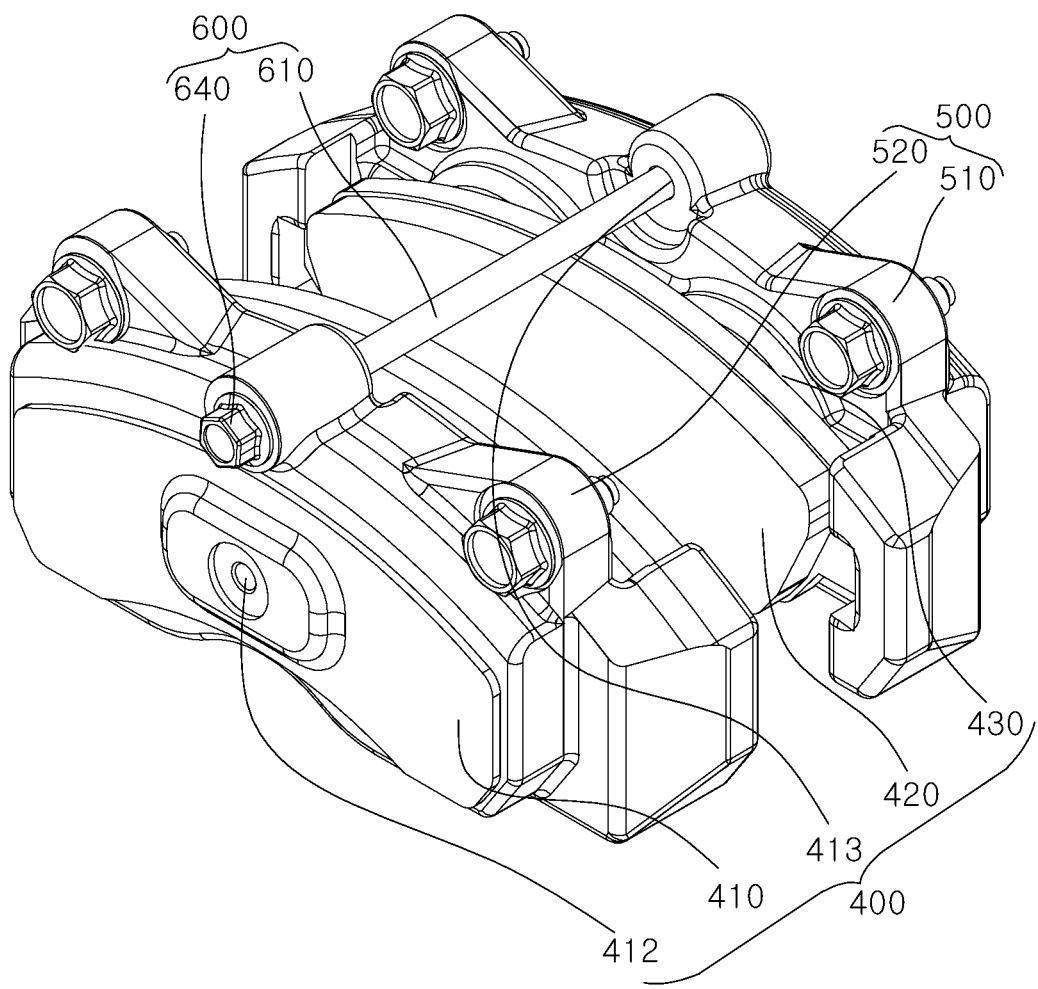
FIG. 11 is a perspective view schematically illustrating the configuration of the brake apparatus for a vehicle in accordance with another embodiment of the present disclosure.

FIG. 10 is a front view schematically illustrating the configuration of the brake apparatus 1' for a vehicle in accordance with another embodiment of the present disclosure, and FIG. 11 is a perspective view schematically illustrating the configuration of the brake apparatus 1' for a vehicle in accordance with another embodiment of the present disclosure.

Referring to FIG. 10 and FIG. 11, the first support part 510 and the second support part 520 in accordance with another embodiment of the present disclosure are disposed on the same axis. That is, the first support part 510 and the second support part 520 are disposed so that the central axis of a through hole is positioned on the same straight line. Correspondingly to this, the first fastening part 110 and the second fastening part 120 are also arranged on the same axis. Accordingly, the first support part 510 and the second support part 520 may be simultaneously coupled to the first fastening part 110 and the second fastening part 120 by single fastening means, so that more efficient and quick assembly is possible.

Although the present disclosure has been described with reference to the embodiments illustrated in the drawings, the embodiments of the disclosure are for illustrative purposes only, and those skilled in the art will appreciate that various modifications and other equivalent embodiments are possible from the embodiments. Thus, the true technical scope of the present disclosure should be defined by the following claims.

What is claimed is:

1. A brake apparatus for a vehicle, comprising:
   a stator unit fixed to an inside of a wheel of the vehicle;
   a rotor unit disposed to face the stator unit and rotated by electromagnetic interaction with the stator unit;
   a disc unit connected to the rotor unit and rotated together with the rotor unit;
   a pair of caliper units disposed on both sides of the disc unit and configured to generate a braking force by contacting with the disc unit as hydraulic pressure is applied, a first caliper unit of the pair of caliper units including a first caliper body part including a first cylinder and a second caliper unit of the pair of caliper units including a second caliper body part including a second cylinder;
   a transfer unit configured to be inserted into a first insertion portion of the first caliper unit and a second insertion portion of the second caliper unit; and
   a port configured to transfer hydraulic pressure by flow of a brake fluid and connected to the first cylinder in the first caliper body part, wherein the first cylinder is connected to the first insertion portion such that the brake fluid is transferred from the port to the transfer unit via the first cylinder and the first insertion portion and flows through the transfer unit to the second insertion portion connected to the second cylinder.

2. The brake apparatus according to claim 1, wherein the first caliper unit includes:
   a first pad plate part disposed between the first caliper body and the disc unit; and
   a first piston slidably installed in the first cylinder, and configured to move forward and backward by hydraulic pressure generated by the first cylinder and to press the first pad plate part toward the disc unit or release pressure on the first pad plate part; and
   the second caliper unit includes:
   a second pad plate part disposed between the second caliper body and the disc unit; and
   a second piston slidably installed in the second cylinder, and configured to move forward and backward by hydraulic pressure generated by the second cylinder and to press the second pad plate part toward the disc unit or release pressure on the first pad plate part.

3. The brake apparatus according to claim 2, wherein the transfer unit comprises:
   a transfer member disposed between the pair of caliper body parts and having both sides connected with an inside of the pair of caliper body parts, respectively;
   a fixing part detachably coupled to the caliper body part and configured to prevent the transfer member from moving relative to the caliper body part; and
   a sealing part installed between the transfer member and the caliper body part, and configured to prevent the brake fluid from leaking to an outside of the caliper body part.

4. The brake apparatus according to claim 3, wherein the first insertion portion penetrates through the first caliper body part and the second insertion portion penetrates through the second caliper body part.

5. The brake apparatus according to claim 4, wherein a flow part extending along a longitudinal direction of the transfer member is defined in the transfer member.

6. The brake apparatus according to claim 4, wherein the fixing part protrudes from an outer circumferential surface of the transfer member and is screwed to an inner circumferential surface of the insertion portion.

7. The brake apparatus according to claim 4, wherein the sealing part is elastically deformable and is in contact with an outer circumferential surface of the transfer member and an inner circumferential surface of the insertion portion.

8. The brake apparatus according to claim 4, further comprising:
   a stopper part extending from the transfer member and configured to limit a length of a portion of the transfer member that is inserted into the insertion portion.

9. The brake apparatus according to claim 8, wherein the stopper part is disposed at one end of the transfer member, and is in contact with an outer surface of any one of the pair of caliper body parts as the transfer member is inserted into the insertion portion by a predetermined distance or more.

10. The brake apparatus according to claim 8, wherein the stopper part has a diameter larger than a diameter of the transfer member.

11. A brake apparatus for a vehicle, comprising:
   a stator unit fixed to an inside of a wheel of the vehicle;
   a rotor unit disposed to face the stator unit and rotated by electromagnetic interaction with the stator unit;
   a disc unit connected to the rotor unit and rotated together with the rotor unit;
   a pair of caliper units disposed on both sides of the disc unit and configured to generate a braking force by contacting with the disc unit as hydraulic pressure is applied; and
   a support unit extending from each of the pair of caliper units and supporting the each of the pair of caliper units with respect to the stator unit, the support unit comprises:
   a first support part extending from one of the pair of caliper units and detachably coupled to a first fastening part extending from the stator unit; and
   a second support part extending from a remaining one of the pair of caliper units and detachably coupled to a second fastening part extending from the stator unit.

12. The brake apparatus according to claim 11, wherein the pair of caliper units are separated from each other and are individually supported on the stator unit by the support unit.

13. The brake apparatus according to claim 12, wherein each of the pair of caliper units comprises:
   a caliper body part disposed to face one surface of the disc unit and including a cylinder configured to generate hydraulic pressure by a brake fluid flowing into the cylinder;
   a pad plate part disposed between the caliper body part and the disc unit; and
   a piston part slidably installed in the cylinder, and configured to move forward and backward by hydraulic pressure generated by the cylinder and to press the pad plate part toward the disc unit or release pressure on the pad plate part.

14. The brake apparatus according to claim 11, wherein the first support part and the second support part are disposed on a same axis.

15. The brake apparatus according to claim 11, wherein the first support part and the second support part are disposed on different axes.

16. The brake apparatus according to claim 11, wherein the first support part and the second support part are provided in plural and disposed to be spaced apart from each other on both sides of the pair of caliper units, respectively.

* * * * *